(12) United States Patent
Gordon et al.

(10) Patent No.: US 10,241,766 B2
(45) Date of Patent: Mar. 26, 2019

(54) APPLICATION BINARY INTERFACE CROSS COMPILATION

(71) Applicant: Microsoft Technology Licensing, LLC, Redmond, WA (US)

(72) Inventors: Matthew Gordon, Redmond, WA (US); Roger John Perkins, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/630,818

(22) Filed: Jun. 22, 2017

(65) Prior Publication Data

US 2018/0373514 A1 Dec. 27, 2018

(51) Int. Cl.
*G06F 9/44* (2018.01)
*G06F 8/41* (2018.01)
*G06F 8/54* (2018.01)

(52) U.S. Cl.
CPC .............. *G06F 8/4441* (2013.01); *G06F 8/54* (2013.01)

(58) Field of Classification Search
CPC .......... G06F 8/443; G06F 8/445; G06F 8/447; G06F 8/4441; G06F 8/433
USPC ......................... 717/151, 153, 136
See application file for complete search history.

(56) References Cited

U.S. PATENT DOCUMENTS

| | | | |
|---|---|---|---|
| 7,616,206 B1 | 11/2009 | Danilak | |
| 7,649,533 B2 | 1/2010 | Engel et al. | |
| 7,746,347 B1 | 6/2010 | Brown et al. | |
| 2005/0140688 A1 | 6/2005 | Pallister | |
| 2006/0055695 A1 | 3/2006 | Abdalla et al. | |
| 2008/0158236 A1 | 7/2008 | Bakalash et al. | |
| 2010/0153934 A1 | 6/2010 | Lachner | |

(Continued)

FOREIGN PATENT DOCUMENTS

| | | |
|---|---|---|
| CN | 103389908 A | 11/2013 |
| EP | 2109304 A1 | 10/2009 |

OTHER PUBLICATIONS

Nickolls, et al., "Graphics and Computing GPUs", in Publication of Morgan Kaufmann, 2009, pp. 2-83.

(Continued)

*Primary Examiner* — Chuck O Kendall
(74) *Attorney, Agent, or Firm* — Alleman Hall Creasman & Tuttle LLP

(57) ABSTRACT

A computing device for just-in-time cross-compiling compiled binaries of application programs that utilize graphics processing unit (GPU) executed programs configured to be executed on a first GPU having a first application binary interface (ABI) including a second GPU having a second ABI different from the first ABI of the first GPU, and a processor configured to execute an application program that utilizes a plurality of GPU-executed programs configured to be executed for the first ABI of the first GPU, execute a run-time executable cross-compiler configured to, while the application program is being executed, emulate the first ABI using hardware resources of the second GPU by translating between the first ABI and the second ABI, and execute the plurality of GPU-executed programs on the second GPU with the emulated first ABI, and pass output of the plurality of GPU-executed programs for the emulated first ABI through the second ABI.

20 Claims, 7 Drawing Sheets

(56) References Cited

U.S. PATENT DOCUMENTS

| | | | |
|---|---|---|---|
| 2013/0159685 A1 | 6/2013 | Ju et al. | |
| 2014/0146062 A1 | 5/2014 | Kiel et al. | |
| 2014/0347371 A1 | 11/2014 | Stenson et al. | |
| 2014/0347375 A1 | 11/2014 | Stenson et al. | |
| 2014/0354669 A1 | 12/2014 | Galazin et al. | |
| 2015/0199787 A1* | 7/2015 | Pechanec | G06F 9/5044 345/522 |
| 2015/0286491 A1 | 10/2015 | Anyuru | |
| 2016/0042549 A1 | 2/2016 | Li et al. | |
| 2016/0117152 A1 | 4/2016 | Baker | |
| 2016/0364216 A1 | 12/2016 | Howes | |
| 2016/0364831 A1 | 12/2016 | Spanton et al. | |
| 2017/0116702 A1 | 4/2017 | Viggers et al. | |

OTHER PUBLICATIONS

"AMD GCN3 ISA Architecture Manuel" AMD Accelerated Parallel Processing Technology; retrieved at <<http://gpuopen.com/compute-product/amd-gcn3-isa-architecture-manual/>>, Version 1.1, Aug. 2016, 2 pages.

"Nvidia Cuda", Available Online at http:/moss.csc.ncsu.edu/~mueller/cluster/nvidia/2.3/cudatoolkit_release_notes_lnux.txt, Available as Early as Jun. 18, 2010, 3 pages.

"Cross Platform Shaders in 2014", Available Online at http://aras-p.info/blog/2014/03/28/cross-plafform-shaders-in-2014/, Mar. 28, 2014, 5 pages.

Farooqui, N. et al., "Dynamic Instrumentation and Optimization for GPU Applications," In Proceedings of the 4th Workshop on Systems for Future Multicore Architectures, Apr. 13, 2014, 6 pages.

"Why do AGAL shaders need to be compiled just-in-time?", Stack Overflow Website, Available Online at https:/stackoverflow.com/questions/23602735/why-do-agal-shaders-need-to-be-compiled-just-in-time, May 12, 2014, 1 page.

"A Generic and Flexible Shader Cross Compiler Library/Tool", GitHub, Inc. Website, Available Online at https://github.com/lotsopa/Savvy, Aug. 27, 2015, 2 pages.

"Unity Manual", Unity Website, Available Online at https://docs.unity3d.com/530/Documentation/Manual/ComputeShaders.html, Retrieved Online on May 26, 2017, Available as Early as 2016, 4 pages.

Bjørge, M., "Porting a Graphics Engine to the Vulkan API", Arm Community Website, Available Online at https://community.arm.com/graphics/b/blog/posts/porting-a-graphics-engine-to-the-vulkan-api, Feb. 16, 2016, 8 pages.

Thacker, J., "Otoy is cross-compiling CUDA for non-Nvidia GPUs", CG Channel Wesbite, Available Online at http://www.cgchannel.com/2016/03/otoy-is-reverse-engineering-cuda-for-non-nvidia-gpus/, Mar. 11, 2016, 6 pages.

"Halide cross-compilation for GPU", Stack Overflow Website, Available Online at http://stackoverflow.com/questions/42651785/halide-cross-compilation-for-gpu, Available as Early as Mar. 7, 2017, 2 pages.

Kyunghyun, Cho, "Introduction to Neural Machine Translation with GPUs (Part 1)", Retrieved from: <<https://devblogs.nvidia.com/parallelforall/introduction-neural-machine-translation-with-gpus/>>, May 27, 2015, 7 Pages.

"Non Final Office Action Issued in U.S. Appl. No. 15/630,797", dated Apr. 24, 2018, 10 Pages.

"Notice of Allowance Issued in U.S. Appl. No. 15/630,836", dated Jun. 19, 2018, 10 Pages.

* cited by examiner

APPLICATION BINARY INTERFACE CROSS COMPILATION

BACKGROUND

Different graphics processing unit architectures may have different instruction set architectures, application binary interfaces, and memory environments. Generally, the instruction set architecture defines the operations available on a given piece of programmable hardware, such as a graphics processing unit, and the application binary interface may include a set of rules that describe the environment in which a program will execute.

SUMMARY

A computing device for just-in-time cross-compiling compiled binaries of application programs that utilize graphics processing unit (GPU) executed programs configured to be executed on a first GPU having a first application binary interface (ABI) is provided. The computing device may include a second GPU having a second ABI different from the first ABI of the first GPU, and a processor configured to execute an application program that utilizes a plurality of GPU-executed programs configured to be executed for the first ABI of the first GPU, execute a run-time executable cross-compiler configured to, while the application program is being executed, emulate the first ABI using hardware resources of the second GPU by translating between the first ABI and the second ABI, and execute the plurality of GPU-executed programs on the second GPU with the emulated first ABI, and pass output of the plurality of GPU-executed programs for the emulated first ABI through the second ABI.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Different graphics processing unit architectures may have different instruction set architectures, application binary interfaces, and memory environments. For example, graphics processing units from different manufacturers, or different generations of graphics processing unit technologies from a single manufacturer may have binary incompatible architectures. These differences may cause a program that was specified for one graphics processing unit architecture to be binary incompatible with another graphics processing unit architecture. The systems and methods described herein perform a just-in-time cross compilation of graphics processing unit executed programs by performing instruction set architecture and application binary interface translation in O(N) complexity to the number of instructions in the program.

Figure 1:
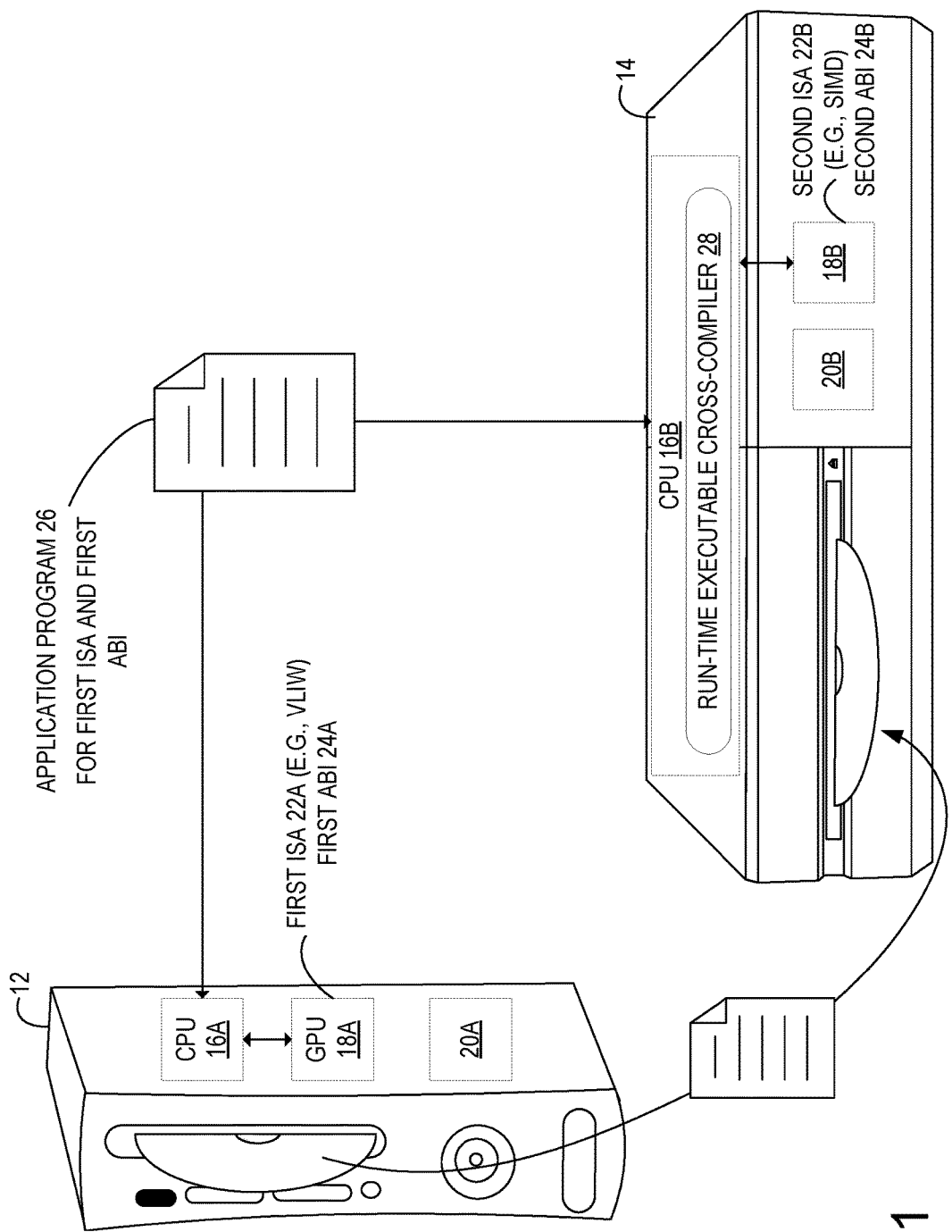
FIG. 1 shows example embodiments of a first computing device and a second computing device of the present description.

FIG. 1 illustrates a first computing device 12 and a second computing device 14 in the form of gaming consoles. The first computing device 12 includes a first processor 16A, a first graphical processing unit (GPU) 18A, and other computing parts 20A including volatile memory, non-volatile memory, a power supply unit, etc. Similarly, the second computing device 14 includes a second processor 16B, a second GPU 18B, and other computing parts 20B. The respective processors and GPUs of the first and second computing devices 12 and 14 are configured to execute application programs, such as, for example, a game application. Additionally, the first and second computing devices 12 and 14 may take other suitable forms, such as, for example, desktop computers, laptops, head mounted display devices, etc.

In one example, the first GPU 18A of the first computing device 12 is architecturally distinct from the second GPU 18B of the second computing device 14. As shown in FIG. 1, the first GPU 18A has a first instruction set architecture (ISA) 22A and a first application binary interface (ABI) 24A, while the second GPU 18B has a second ISA 22B and a second ABI different from the first ISA 22A and first ABI 24A of the first GPU 18A. Due to architectural differences between the first GPU 18A and the second GPU 18B, application programs configured to be executed using the first processor 16A and first GPU 18A may not be successfully executed using the second processor 16B and second GPU 18B, and vice versa. For example, a compiled binary of an application program 26 may utilize GPU-executed programs configured to be executed on the first GPU 18A having the first ISA 22A and the first ABI 24A. Thus, as the compiled binary of the application program 26 was configured for the specific architecture of the processor 16A and GPU 18A of the first computing device 12, the application program 26 may be run natively on the first computing device 12 without needing modifications. However, the same compiled binary of the application program 26 is not binary compatible with the second ISA 22B and second ABI 24B of the second GPU 18B of the second computing device 14. Thus, the application program 26 will not successfully be executed on the second computing device 14 without modification.

In one specific example, the first ISA 22A may be an instruction-level parallelism, Very Long Instruction Word (VLIW) type of ISA. In an example VLIW ISA, a single instruction may consume up to 12 inputs and produce up to 4 outputs. Additionally, in the example VLIW ISA, a general purpose register (GPR) is a group of four individually addressable elements, and thus instructions may consume input from up to 3 GPR inputs and output to 1 GPR. The GPRs are generally equivalent, although some special purpose registers do exist. Memory operations are implemented by special instructions referencing special purpose hardware registers, and memory transactions appear as if they are completed instantly. The example VLIW ISA also expresses a further degree of explicit pipeline-parallelism in the form of instruction co-issues, where a first family of instructions may be simultaneously issued with a second family of instructions, with co-mingled register usage.

On the other hand, the second ISA 22B may be a Simultaneous Instruction Multiple Data (SIMD) type of ISA where the same program is executed concurrently in lock-step on multiple streams of data. A typical instruction for an example SIMD ISA may consume up to 3 inputs and produces 1 output. In contrast to the example VLIW ISA, the GPRs of the example SIMD ISA are singular. Thus, instructions in the example SIMD ISA may consume input from up to 3 GPRs and output results to 1 GPR. In the example SIMD ISA, there are two families of GPR, each having different parallelism properties. Additionally, memory operations occur by special operations consuming GPRs, and memory transactions must be initiated and then explicitly completed. In the example SIMD ISA, instruction-parallelism is implicit in contrast to the explicit instruction-parallelism of the example VLIW ISA.

Due to the differences in architecture and design discussed above, application programs utilizing GPU-executed programs specified for the example VLIW ISA and a corresponding ABI are not binary compatible with the SIMD ISA and a corresponding ABI. However, by taking these known differences into account, instructions for the example VLIW ISA may be translated to instructions for the example SIMD ISA via rules mapping. As illustrated in FIG. 1, the processor 16B of the second computing device 14 may execute a run-time executable cross compiler 28 configured to translate the compiled binary of the application program 26 such that the application program 26 may be executed by the processor 16B and GPU 18B of the second computing device 14. It will be appreciated that the above VLIW and SIMD examples for the first and second ISAs 22A and 22B and first and second ABIs 24A and 24B are merely exemplary, and that other types of binary incompatible ISAs and ABIs not specifically mentioned above may also be translated between by the computer implemented processes and methods, including the run-time executable cross-compiler 28, described herein.

Figure 2:
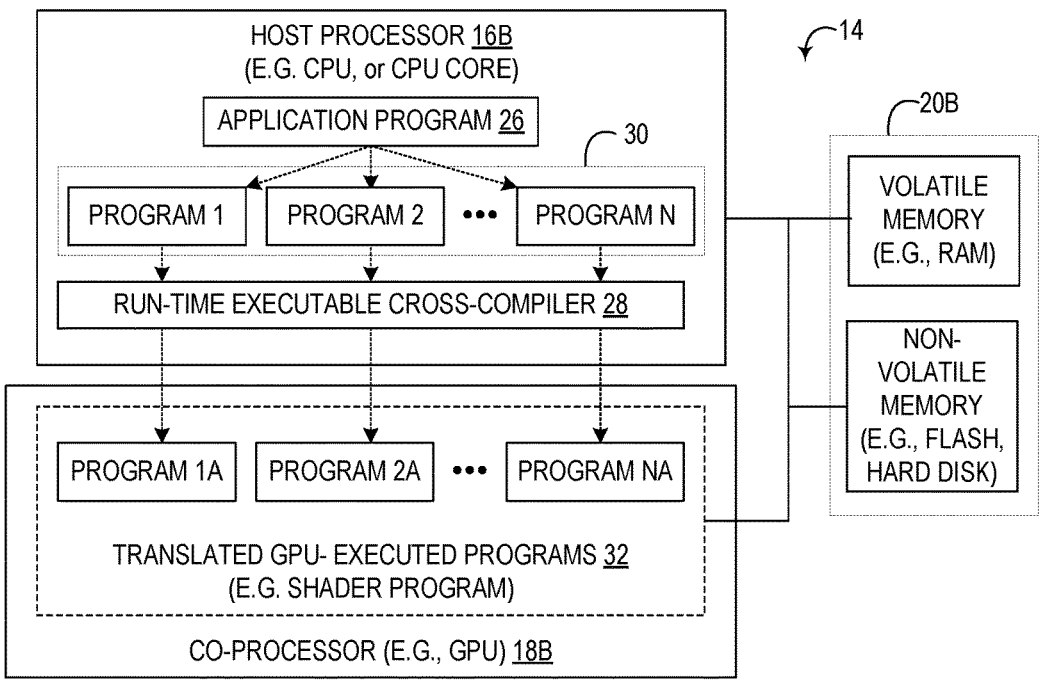
FIG. 2 shows an example run-time executable cross-compiler for the second computing device of FIG. 1.

FIG. 2 illustrates an example computing device, such as the second computing device 14, for just-in-time cross-compiling compiled binaries of application programs that utilize GPU-executed programs configured to be executed on a first GPU 18A having a first ISA 22A and a ABI 24A. As illustrated, in FIGS. 1 and 2, the second computing device 14 includes a co-processor, such as the second GPU 18B, having the second ISA 22B and second ABI 24B different from the first ISA 22A and first ABI 22B of the first GPU 18A. The second computing device 14 further includes a host processor, such as the second processor 16B, configured to execute an application program 26 that utilizes a plurality of GPU-executed programs 30 configured to be executed for the first ISA 22A and first ABI 24A of the first GPU 18A of the first computing device 12.

However, as discussed above, the plurality of GPU-executed programs 30 that are specified for the first ISA 22A and first ABI 24A cannot be executed by the second GPU 18B having the second ISA 22B and second ABI 24B without translation. Thus, the second processor 16B is further configured to execute a run-time executable cross-compiler 28 configured to, while the application program 26 is being executed, translate compiled binary of the plurality of GPU-executed programs 30 from the first ISA 22A to the second ISA 22B.

As illustrated in FIG. 2, GPU-executed programs, such as shader programs, are typically executed in a sequence of GPU-executed programs using a successive execution model. Thus, for an example rendering pipeline, the application program 26 may utilize a plurality of GPU-executed programs 30 arranged in a sequence, such as in the sequence program 1, program 2, . . . , program N, illustrated in FIG. 1. The successive execution model creates semantic bindings between these programs in the sequence. When 'bound' into a particular sequence, a single GPU-executed program may continue to express the same semantics, but may modify how it communicates with peer GPU-executed programs in the sequence. For example, each GPU-executed program in the sequence may decode/encode inputs and outputs differently depending upon the other GPU-executed programs in the sequence. As another example, a GPU-executed program may elide specific outputs entirely, or may assume 'default' values for specific inputs, depending upon the other GPU-executed programs in the sequence. As yet another example, the specific in-memory resources (data) that each GPU-executed program references including the exact input and output behavior is a function of the particular sequence of plurality of GPU-executed programs 30 and resources set. The particular rules of sequence and resource binding are a function of the GPU architecture and software stack, and may vary between GPU architectures.

The run-time executable cross-compiler 28 executed by the second processor 16B of the second computing device 14 is configured to translate a GPU-executed program compiled and bound for the first GPU 16A of the first computing device 12, such that the translated GPU-executed program meets all of the requirements and constraints of the second GPU 18B of the second computing device 14 when sequenced with a particular set of peers and resources. That is, the compiled binary of the application program 26 includes sequences of GPU-executed programs 30 that have already been compiled and bound according to the requirements and constraints of the first GPU 18A having the first ISA 22A and first ABI 24A. However, the requirements and constraints of the first GPU 18A are not the same as for the second GPU 18B due to architectural differences.

Thus, the run-time executable cross-compiler 28 analyzes a particular sequence of a plurality of GPU-executed programs 30 that are currently about to be executed during run-time of the application program 26, to determine summary data for the sequence including the peers of each GPU-executed program in the sequence, metadata that is stable with respect to GPU-executed program bindings in the sequence, and weakly bound data resources used during execution of the sequence. The run-time executable cross-compiler 28 then individually translates each GPU-executed program in the plurality of GPU-executed programs 30 while taking into account the determined summary data, such that the translated GPU-executed program meets all of the requirements and constraints of the second GPU 18B of the second computing device 14 for the particular set of peers and resources in the sequence.

In one example, the run-time executable cross-compiler 28 delays cross-compilation and translation of individual GPU-executed programs until a full sequence of a plurality of GPU-executed programs 30 is presented for execution. That is, the run-time executable cross-compiler 28 does not statically discover every GPU-executed program in isolation in the compiled binary of the application program 26. Starting with the compiled binary of a whole conventional program, it is generally not practical to find the embedded shader program listings and the semantics of their utilization. Attempting to do so directly would require statically evaluating all dynamically possible code paths to determine all possible shader programs and their arrangement into pipelines. Such an oracle shares properties with a Halting Problem oracle. Thus, in one example, the run-time executable cross-compiler 28 translates GPU-executed programs, such as shader programs, as they are used by the application program 26 in a just-in-time manner. At the point in time that a GPU-executed program is about to be used by the application program 26, the entire sequence of the plurality of GPU-executed programs 30 is known, and thus does not require static discovery to determine the GPU-executed program and its execution context including the particular bindings in the sequence of GPU-executed programs.

At or near the point in time that a GPU-executed program is to be used by the application program 26, the run-time executable cross-compiler 28 inspects the entire sequence of peers of GPU-executed programs and gathers summary data. For example, when cross-compiling GPU-executed program 'program 1' from the sequence (program 1, program 2) illustrated in FIG. 2, the second GPU 18B→program 1→program 2 binding is fully computed and 'program 1' is translated to the second ISA 22B and second ABI 24B of the second GPU 18B. When 'program 2' is subsequently cross-compiled, the program 1→program 2→second GPU 18B binding is evaluated to exactly compatible results and 'program 2' is cross-compiled. In other words, the run-time executable cross-compiler 28 is stable with respect to a sequence of a plurality of GPU-executed programs 30, not just a single GPU-executed program.

In some examples, it is common for bindings to be compatible. That is, for both of the architectures of the first and second GPUs 18A and 18B, 'program 1' binds identically in the bindings (program 1, program 2) and (program 1, program N). In such circumstances, a single cross-compilation of program 1 will be compatible for both bindings (program 1, program 2) and (program 1, program N). Thus, in this example, the run-time executable cross-compiler 28 is configured to identify bindings specific bindings in a sequence. In one specific example, the run-time executable cross-compiler 28 is configured to inspect a sequence of a plurality of GPU-executed programs 30, compute a binding between peer GPU-executed programs in the sequence, and then produce an output translation that is stable with respect to that identified binding. Further in this example, the run-time executable cross-compiler 28 may be configured to cache each cross-compilation result.

As illustrated in FIG. 2, at or near the point in time that a sequence of the plurality of GPU-executed programs 30 is to be utilized by the application program 26 during run-time, the run-time executable cross-compiler 28 translates each GPU-executed program that was compiled and bound for the first GPU 16A of the first computing device 12, such that the translated GPU-executed program meets all of the requirements and constraints of the second GPU 18B of the second computing device 14 including the bindings in the sequence. In the illustrated example, the sequence of GPU-executed programs 30 'program 1, program 2, . . . , program N' is translated to a corresponding sequence of translated GPU-executed programs 32 'program 1A, program 2A, . . . , program NA'. It will be appreciated that while a sequence of GPU-executed programs is translated into a sequence of translated GPU-executed programs having the same number of programs in a 1:1 translation in the example illustrated in FIG. 2, that each GPU-executed program may potentially be translated into any suitable number of translated GPU-executed programs. For example, a single GPU-executed program for the first ISA 22A and first ABI 24A of the first GPU 18A may be translated into zero to N GPU-executed programs for the second ISA 22B and second ABI 24B of the second GPU 18B depending upon the architectural differences between the GPUs.

Figure 3:
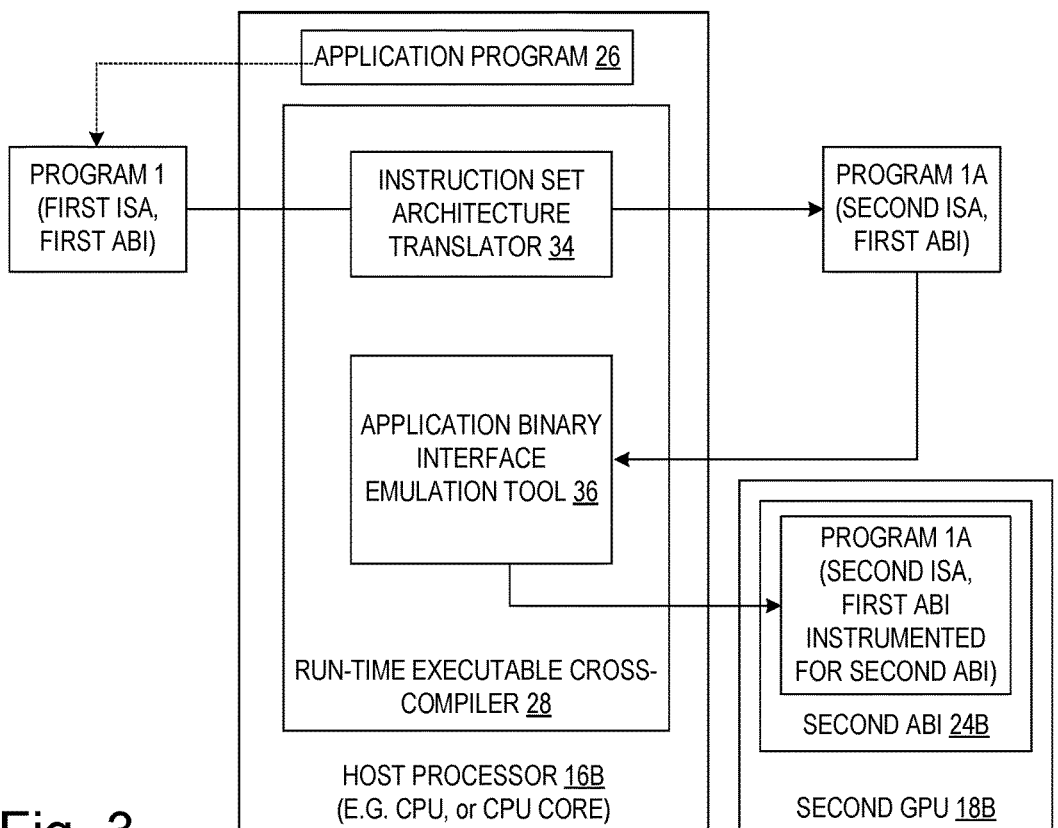
FIG. 3 continues the example run-time executable cross-compiler of FIG. 2.

FIG. 3 shows an example run-time executable cross-compiler 28 that includes an ISA translator 34 and an ABI emulation tool 36. In the illustrated example, a GPU-executed program 'program 1' is processed by the ISA translator 34 of the run-time executable cross-compiler 26. The ISA translator 34 inspects the sequence of the plurality of GPU executed-programs 30 that includes the particular GPU-executed program 'program 1', gathers the summary data discussed above, and then translates the GPU-executed program 'program 1' that was compiled and bound for the first GPU 16A of the first computing device 12, such that the corresponding translated GPU-executed program 'program 1A' meets all of the requirements and constraints of the second GPU 18B of the second computing device 14 including the bindings in the sequence.

In one example, the ISA translator 34 is configured to translate each instruction of the first ISA 22A in the GPU-executed program 'program 1' to a corresponding zero to N instructions of the second ISA 22B based on rules mapping. Depending upon the specific GPU architectures, an instruction in the first ISA 22A does not always have an exact equivalent instruction in the second ISA 22B, such as in the example VLIW and SIMD architectural mismatch discussed previously. Thus, one instruction in the first ISA 22A may expand to zero instructions in the second ISA 22B when, for example, that instruction was peculiar to the hardware architecture of the first GPU 18A, or that instruction may be implicitly performed by the hardware of the second GPU 18B. In another example, one instruction in the first ISA 22A may expand to more than one instructions in the second ISA 22B, when, for example, multiple instructions from the second ISA 22B are required to be performed in sequence to perform a semantically equivalent function to that one instruction of the first ISA 22A.

In one specific example, the ISA translator 34 includes mappings between each instruction in the first ISA 22A and corresponding zero or more instructions in the second ISA 22B. That is, each particular instruction in the first ISA 22A is specifically mapped to zero or more particular instructions in the second ISA 22B, and the ISA translator 34 translates each GPU-executed program according to the mappings. In one example, the mappings are binary instruction to binary instruction. That is, the run-time executable cross-compiler 28 including the ISA translator 34 operates in a binary domain, and is configured to translate the plurality of GPU-executed programs 30 without inflation to an intermediate representation including a control flow graph. Thus, it will be appreciated that the run-time executable cross-compiler 28 is not recompiling source code or generating a higher level code representation and/or control flow graph of the already compiled binary of the GPU-executed programs before producing the translated GPU-executed programs. Rather, in one example, the run-time executable cross-compiler 28 is configured to perform binary-to-binary translations of first ISA 22A instructions of the untranslated GPU-executed program to second ISA 22B instructions for the translated GPU-executed program.

In one example, the run-time executable cross-compiler is configured to translate the plurality of GPU-executed programs 30 without co-mingling first ISA 22A instructions of the plurality of GPU-executed programs 30. That is, the sequence of first ISA 22A instructions in a particular GPU-executed program is not changed during translation by the run-time executable cross-compiler 28. For example, the run-time executable cross-compiler 28 does not rearrange or combine first ISA 22A instructions that will be translated. In one specific example, any given instruction including operands in the first ISA 22A for a GPU-executed program always expands to the same corresponding sequence of instructions for the second ISA 22B. This consistent instruction translation design ensures that the translation from the first ISA 22A to the second ISA 22B may proceed in static program order but operate equivalently for any arbitrary execution order, regardless of data-dependent flow control/execution mask decisions and complexity.

After translation by the ISA translator 34, the translated GPU-executed programs 32 include instructions from the second ISA 22B corresponding to instructions from the first ISA 22A, such that the translated GPU-executed programs 32 may execute to semantically equivalent results in the second GPU 18B as the untranslated GPU-executed programs 30 would execute to with the first GPU 18A. However, the translated GPU-executed programs 32 are still configured according to the rules of the first ABI 24A, such as GPR usage patterns, coordinate system for inputs, encoding, GPR locations, scope of execution, and other characteristics of the first ABI 24A.

Thus, in one example, the run-time executable cross-compiler 28 further includes an ABI emulation tool 36 that is configured to emulate the first ABI 24A using the hardware resources of the second GPU 18B, which includes translating between the first ABI 24A of the first GPU 18A and second ABI 24B of the second GPU 18B at the entry and exit points of the plurality of translated GPU-executed programs 32. In the example illustrated in FIG. 3, the ISA translator 34 translates one GPU-executed program 'program 1' from the first ISA 22A to the second ISA 22B, producing the translated GPU-executed program 'program 1A'. However, the translated GPU-executed program 'program 1A' is still configured according to the rules of the first ABI 24A, such as GPR usage patterns, coordinate system for inputs, encoding, GPR locations, scope of execution, and other characteristics of the first ABI 24A. Thus, without ABI emulation, the translated GPU-executed program 'program 1A' may not correctly execute on the second GPU 18B.

In one example, to emulate the first ABI 24A, the ABI emulation tool 36 of the run-time executable cross-compiler 28 is configured to translate from the second ABI 24B to the first ABI 24A before execution of a translated GPU-executed program 32, and translate from the first ABI 24A to the second ABI 24B after execution of the translated GPU-executed program 32. In this manner, the rules of the first ABI 24A is nested inside the rules of the second ABI 24B. In one specific example, the ABI emulation tool 36 may be configured to rearrange and reassign inputs and outputs to the GPRs of the second GPU 18B to emulate the GPR behavior of the first ABI 24A for the first GPU 18A. In the VLIW vs SIMD ISA example, GPRs in the VLIW ISA and associated ABI is a group of four individually addressable elements, while GPRs in the SIMD ISA and associated ABI is a singular. Thus, to emulate the VLIW and associated ABI GPRs using the SIMD ISA and associated ABI GPRs, the ABI emulation tool 36 may be configured to assign four GPRs of the SIMD ISA together to emulate one GPR of the VLIW ISA. By associating GPRs together in this manner, the ABI emulation tool 36 may emulate the GPR environment and rules of the first GPU 18A using the hardware resources of the second GPU 18B. Similarly, the ABI emulation tool 36 may be configured to emulate each characteristic of the first ABI 24A, such as coordinate system for inputs, encoding, GPR usage patterns, scope of execution, etc., using the rules of the second ABI 24B and the hardware resources of the second GPU 18B.

As discussed above, from a process flow point of view, the ABI emulation tool 36 is configured to translate program inputs from the second ABI 24B to the first ABI 24A before execution of a translated GPU-executed program 32, and translate program outputs from the first ABI 24A to the second ABI 24B after execution of the translated GPU-executed program 32. More specifically, the run-time cross compiler is configured to translate an instruction set of each of the plurality of GPU executed programs to produce a plurality of translated GPU executed programs 32. To emulate the first ABI 24A, the run-time executable cross-compiler is configured to translate from the second ABI 24B to the first ABI 24A and translate from the first ABI 24A to the second ABI 24B by insertion of corresponding ABI translation program instructions into the translated GPU executed programs 32 prior to execution of the programs. The second GPU 18B is configured to execute those ABI translation program instructions during execution of each translated GPU-executed program 32. By nesting the first ABI 24A inside the second ABI 24B in this manner, from the perspective of the sequence of translated GPU-programs 32, they are being executed within a first ABI 24A environment. On the other hand, from the perspective of the hardware of the second GPU 18B, the inputs and outputs to the sequence of translated GPU-programs 32 conforms to the rules and characteristics of the second ABI 24B. That is, each input/communication from the second GPU 18B to the sequence of translated GPU-executed programs 32 conforms to the rules of the second ABI 24B, but are appropriately translated from the second ABI 24B to the first ABI 24A such that a translated GPU-executed program receives input/communication conforming to the rules of the first ABI 24A. Additionally, each output/communication from the sequence of translated GPU-executed programs 32 to the second GPU 18B conforms to the rules of the first ABI 24A, but are appropriately translated from the first ABI 24A to the second ABI 24B such that the hardware/software of the second GPU 18B receives output/communication conforming to the rules of the second ABI 24B.

In one example, the ABI emulation tool 36 of the run-time executable cross-compiler 28 is configured to emulate the first ABI 24A without inflation to an intermediate representation including a control flow graph. Thus, it will be appreciated that the run-time executable cross-compiler 28 is not recompiling source code or generating a higher level code representation and/or control flow graph of the already compiled binary of the GPU-executed programs when emulating the first ABI 24A using the hardware resources of the second GPU 18B.

As illustrated in FIG. 3, after translation by the ISA translator 34 and emulation by the ABI emulation tool 36 of the run-time executable cross-compiler 28, the second processor 16B of the second computing device 14 may proceed to execute the translated plurality of GPU-executed programs 32 on the second GPU 18B. The results of execution of the translated plurality of GPU-executed programs 32 may then be returned to the application program 26 currently being executed.

It will be appreciated that while the example illustrated in FIG. 3 conceptually shows that the ISA translator 34 and the ABI emulation tool 36 operate sequentially, the run-time executable cross-compiler may execute both steps either concurrently as part of one translation step, or sequentially as shown. In another example, the run-time executable cross-compiler 28 may execute either of the ISA translator 34 and the ABI emulation tool 36 without the other. In one specific example, the ISA of a particular GPU architecture may evolve/change over time while the underlying hardware and ABI remain unchanged. Thus, the run-time executable cross-compiler 28 may be configured to only translate GPU-executed programs from a first ISA to a second ISA, and not translate/emulate between ABIs as the ABI and hardware resources of the GPU have not changed. In another specific example, the drivers of a GPU may be updated such that the current ABI of the GPU is incompatible with the previous ABI of that GPU, without changing the ISA for that GPU. Thus, the run-time executable cross-compiler 28 may be configured to only emulate/translate between a first ABI and a second ABI, and not translate between ISAs as the ISA for that GPU has not changed.

Figure 4:
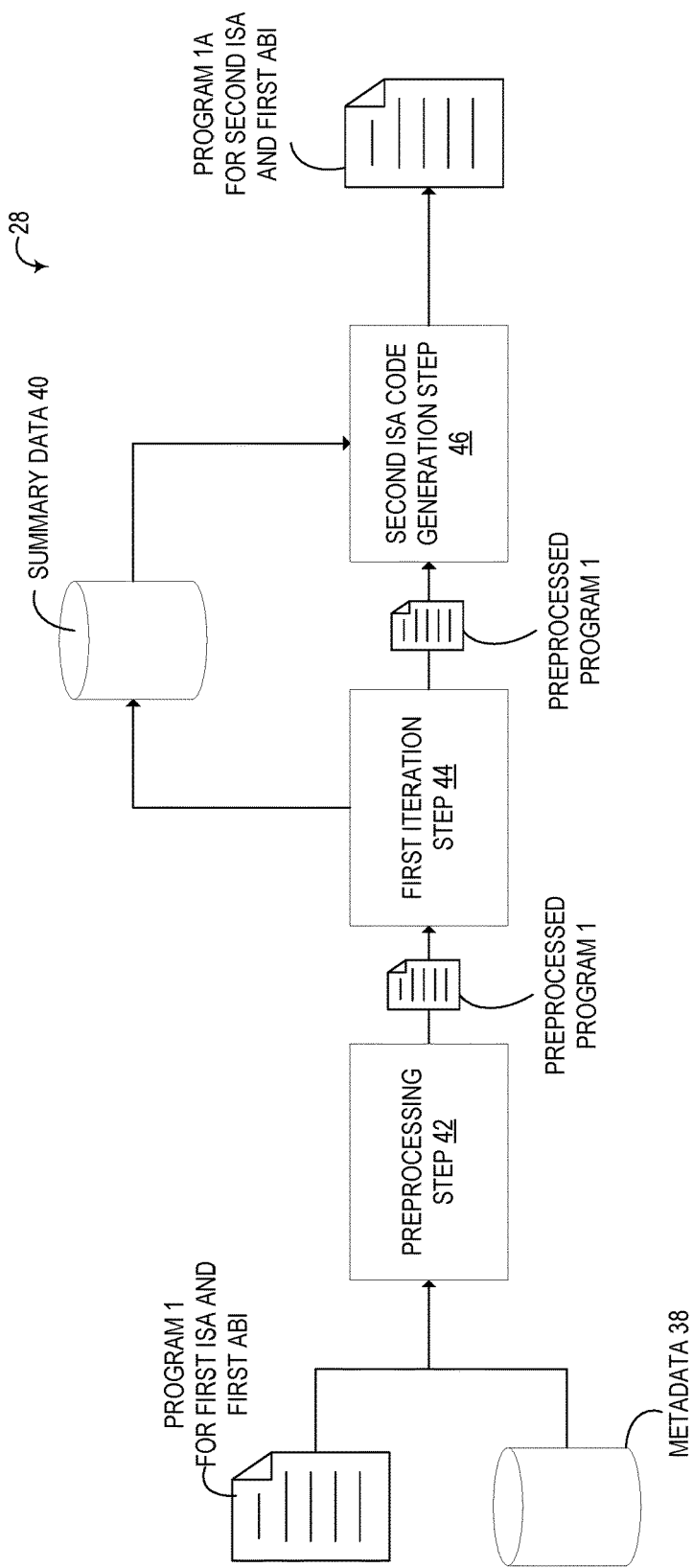
FIG. 4 continues the example run-time executable cross-compiler of FIG. 3.

FIG. 4 shows an example translation process of an example GPU-executed program 'program 1' by the run-time executable cross-compiler 28 executed by the second processor 16B of the second computing device 14. As illustrated, at preprocessing step 42, the run-time executable cross-compiler 28 is configured to preprocess the plurality of GPU-executed programs 30 before performing translation. In the illustrated example, the run-time executable cross-compiler 28 preprocesses an example GPU-executed program 'program 1' that is strictly legal for execution on the first GPU 18A of the first device 12, and relaxes constraints that are not required for the second GPU 18B of the second device 14. The run-time executable cross compiler 28 may be configured to preprocess the example GPU-executed program 'program 1' based on predetermined rules and metadata 38, which, for example, may include data relating to a state of the second GPU 18B. The resulting preprocessed GPU-executed program is semantically equivalent, but is no longer strictly correct for execution on the first GPU 18A.

In one example, to preprocess the plurality of GPU-executed programs 30, the run-time executable cross-compiler 28 is configured to remove instructions of the first ISA 22A that would translate to zero instructions in the second ISA 22B. In one specific example, a GPU-executed program specified for the first GPU 18A may include various instructions that are specific for the hardware for the first GPU 18A itself, such as hints or inputs to the first GPU 18A of what type of processing to do next. These first ISA 22A instructions may be handled implicitly or may not be relevant to the second GPU 18B, and thus have no corresponding second ISA 22B instructions. Thus, the run-time executable cross-compiler 28 may be configured to remove these instructions before translation.

In another example, to preprocess the plurality of GPU-executed programs, the run-time executable cross-compiler is configured to remove instructions which would be unreachable during execution, and remove flow control instructions which would always flow to themselves during execution. In one specific example, a GPU-executed program specified for the first GPU 18A may include various instructions that satisfy esoteric or specific rules of the first GPU 18A. For example, the first GPU 18A may have requirements for the number of instructions contained in programs to be executed. Thus, to satisfy these requirements, a GPU-executed program may include "dead code" that is not intended to be executed to perform a function, but fulfills specific requirements of the first GPU 18A. As the second GPU 18B may not have these same requirements, the "dead code" may be removed before performing translation from the first ISA 22A to the second ISA 22B.

Flow control in compiled binary of the GPU-executed programs may refer to specific line numbers in the instructions. For example, loops may specify a particular instruction line number. If instructions are removed as discussed above, the number of instructions will change, and flow controls in the GPU-executed programs will no longer refer to the correct instruction line number. Thus, the run-time executable cross-compiler may be configured to update flow control in the GPU-executed programs to refer to an appropriate instruction line number after code is removed during preprocessing.

As illustrated in FIG. 4, the run-time executable cross-compiler 28 is configured to perform a first iteration step 44 on the preprocessed example GPU-executed program "program 1". At the first iteration step 44, the run-time executable cross-compiler 28 may be configured to, before translating each GPU-executed program of the plurality of GPU-executed programs 30, iterate through instructions of that GPU-executed program to gather summary data 40 selected from the group consisting of register usage data, memory access pattern data, and implicit control flow graph data. The run-time executable cross-compiler 28 may be configured to perform the preprocessing step 42 and first iteration step 44 on an entire sequence of GPU-executable programs. That is, the entire sequence is preprocessed to relax constraints that are not meaningful for the second GPU 18B, and then iterate through the entire preprocessed sequence of GPU-executable programs to gather summary data 40 for the sequence. In one example, during the first iteration step 44, the run-time executable cross-compiler 28 may be configured to inspect the bindings between successive GPU-executed programs in the sequence for the first ISA 22A, and determine how those bindings will translate to bindings between translated GPU-executed programs in the sequence for the second ISA 22B.

In another example, the run-time executable cross-compiler 28 may be configured to build use-def information described where variables are defined and used in the sequence of GPU-executed programs for the first ISA 22A, and identify instructions or resources that are not required in the second ISA 22B for the second GPU 18B. For example, the second GPU 18B may perform certain functions implicitly, and thus first ISA 22A instructions to perform those functions are not required in a translation to the second ISA 22B.

In another example, the run-time executable cross-compiler 28 may be configured to, during the first iteration step 44, determine a schedule of memory transactions issued in the first ISA 22A when the parameters of the transaction are statically provable. The schedule of memory transactions may be used by the run-time executable cross-compiler 28 to appropriately handle corresponding memory transactions in the second ISA 22B.

In another example, the run-time executable cross-compiler 28 may be configured to, during the first iteration step 44, identify memory resources, such as, for example, image data, consumed by a GPU-executed program, so that the translated GPU-executed programs may be appropriately bound by the containing application program 26 when translated by the run-time executable cross-compiler 28.

In another example, during the first iteration step 44, the run-time executable cross-compiler 28 is configured to gather register usage data and memory access pattern data for the summary data 40. Based on the register usage data and memory access pattern data, the run-time executable cross-compiler 28 may be configured to allocate registers in the second ISA 22B for ABI translation from the first ISA 22A to the second ISA 22B. Additionally, the run-time executable cross-compiler 28 may be configured to map register resources consumed in the first ISA 22A to the second ISA 22B, and mark remaining register resources as available to use. In this manner, the run-time executable cross-compiler 28 may allocate second ISA 22B and ABI 24B GPRs to emulate the memory environment of the first ISA 22A and ABI 22A, such that the translated GPU-executed programs may be executed in the emulated first ABI 22A environment. Remaining register resources not required to suitably emulate the first ABI 24A register usage may be allocated to handle second GPU 18B functions external to the translated GPU-executed programs.

As illustrated in FIG. 4, after the first iteration step 44 to gather the summary data 40, the run-time executable cross-compiler 28 is configured to translate the plurality of GPU-executed programs 30 based on rules mapping between instructions of the first ISA 22A and the second ISA 22B, and the summary data 40. At the second ISA code generation step 46, the run-time executable cross-compiler 28 instruction-by-instruction translates each first ISA instruction 22A in the preprocessed GPU-executed program to corresponding zero to N instructions in the second ISA 22B. As discussed previously, the ISA translator 34 may include mappings between each instruction in the first ISA 22A and corresponding zero or more instructions in the second ISA 22B, and the ISA translator 34 translates each GPU-executed program according to the mappings. The run-time executable cross-compiler 30 is further configured to translate instructions from the first ISA 22A to the second ISA 22B based on the summary data 40, including data for bindings between GPU-executed programs in a sequence, inputs and output of each GPU-executed program, GPR usage data, etc.

After being processed by the preprocessing step 42, first iteration step 44, and second ISA code generation step 46, the example GPU-executed program 'program 1' is translated to the example translated GPU-executed program 'program 1A' for the second ISA 22B and first ABI 24A. As discussed previously, the run-time executable cross-compiler may perform the above steps on an entire sequence of GPU-executed programs.

Figure 5:
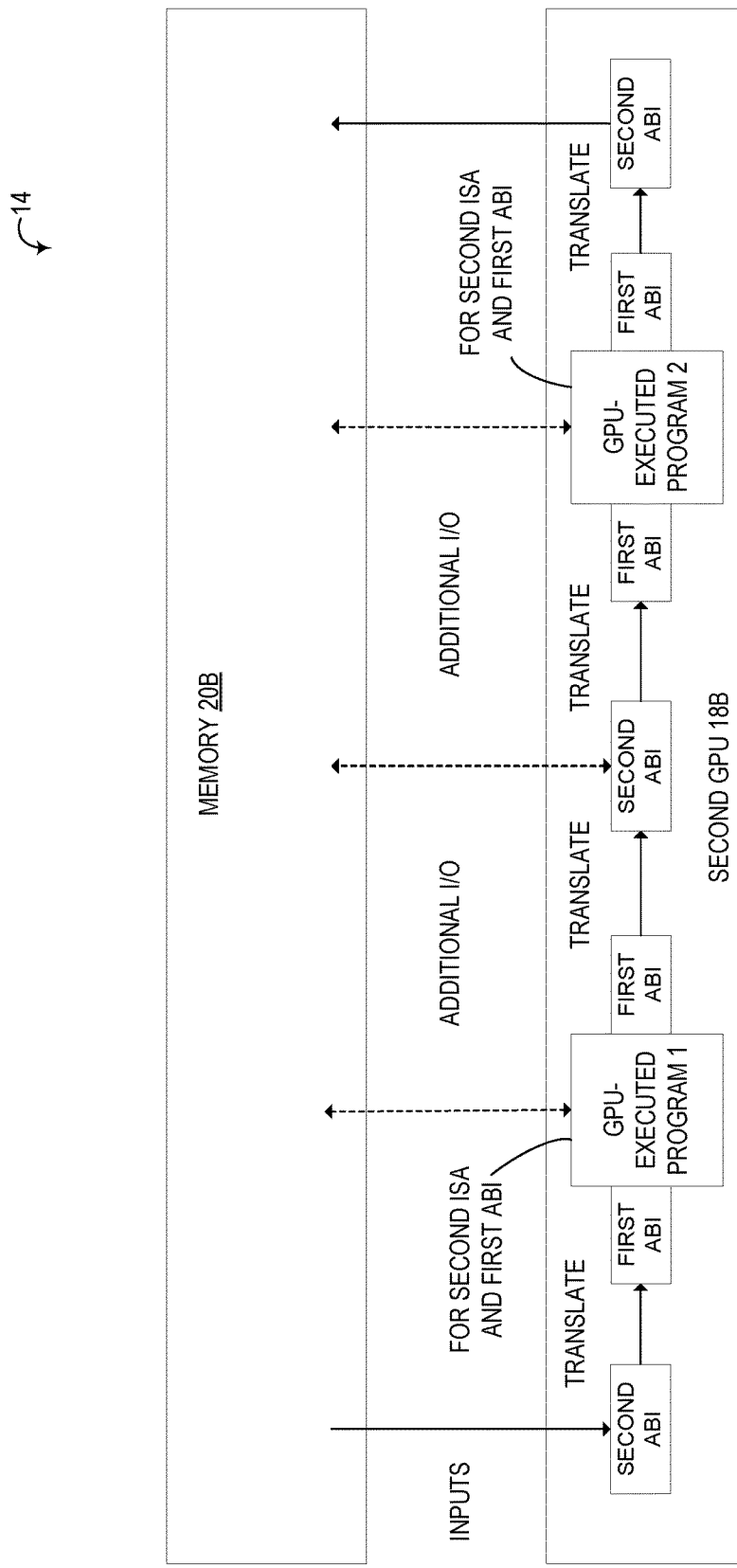
FIG. 5 shows an example sequence of GPU-executed programs translated by the example run-time executable cross-compiler of FIG. 2.

Now turning to FIG. 5, each translated GPU-executed program includes instructions for the second ISA 22B specified for the first ABI 24A. However, as the second GPU 18B is specified for the second ABI 24B, the translated GPU-executed programs may not appropriately execute on the second GPU 18B. In one specific example, inputs and outputs between memory included in the other computing parts 20B of the second computing device 14 and the second GPU 18B will conform to conventions of the second ABI 24B of the second GPU 18B. Thus, input destined for a translated GPU-executed program, such as textures of the application program 26, is translated from the second ABI 24B to the first ABI 24A. Similarly, outputs from a translated GPU-executed program specified for the first ABI 24A will conform to conventions of the first ABI 24A. Thus, in order for the second GPU 18B to correctly handle the outputs, the run-time executable cross-compiler is configured to translate the output conforming to the first ABI 24A to the second ABI 24B.

In one example, translating between the first ABI 24A and second ABI 24B is accomplished by adding one or more instructions to each of the plurality of GPU-executed programs prior to execution of the plurality of GPU executed programs by the second GPU 18B. For example, when translating from the first ISA 22A to the second ISA 22B, the run-time executable cross-compiler may be configured to add additional prologue instructions before the translated ISA instructions that are configured to modify input formatted for the second ABI 24B and convert it to input formatted for the first ABI 24A, such that the translated ISA instructions may execute correctly with the converted/translated input. Additionally, the run-time executable cross-compiler may be further configured to add epilogue instructions after the translated ISA instructions that are configured modify output formatted for the first ABI 24A and convert it to output formatted for the second ABI 24B, such that the second GPU 18B may correctly handle the converted/translated output when the cross compiled program is executed by the second GPU 18B.

In the above manner, the run-time executable cross-compiler translates inputs at or near entry points to translated GPU-executed programs from the second ABI 24B to the first ABI 24A, and translated outputs at or near exit points from translated GPU-executed programs from the first ABI 24A back to the second ABI 24B. By emulating the first ABI 24A using hardware resources of the second GPU 18B in this manner, the second processor 16B may execute the plurality of GPU-executed programs on the second GPU 18B with the emulated first ABI, and pass output of the plurality of GPU-executed programs for the emulated first ABI through the second ABI 24B. Output from each of the plurality of GPU-executed programs formatted for the first ABI 24A may be passed to other peer programs in the sequence of GPU-executed programs, or to other functions of the second GPU 18B, through the second ABI 24B by translating between the first and second ABIs.

In the example illustrated in FIG. 5, inputs to the example translated GPU-executed program 1 are translated from the second ABI 24B to the first ABI 24A. Each instruction of the example translated GPU-executed program 1 is executed in the emulated first ABI 24A environment, including any interim calculations and/or manipulations of the data of the input. The output of the example GPU-executed program 1 is translated back to the second ABI 24B from the first ABI 24A. In some examples, additional input/output may be exchanged between memory and the second GPU 18B. Next, the output of the GPU-executed program 1 and any additional input/output may be translated from the second ABI 24B to the first ABI 24A, and passed to the next translated GPU-executed program in the sequence. In this example, the example translated GPU-executed program 2 receives the output of the previous example GPU-executed program 1 conforming to the conventions of the first ABI 24A. Similarly, the example GPU-executed program 2 executes its instructions in the first ABI 24A emulated environment, and generates output conforming to conventions of the first ABI 24A. Next, the run-time executable cross-compiler 28 translates the output from the first ABI 24A back to the second ABI 24B, and sends the output to the containing application program 26 via the memory of the second computing device 14.

Figure 6:
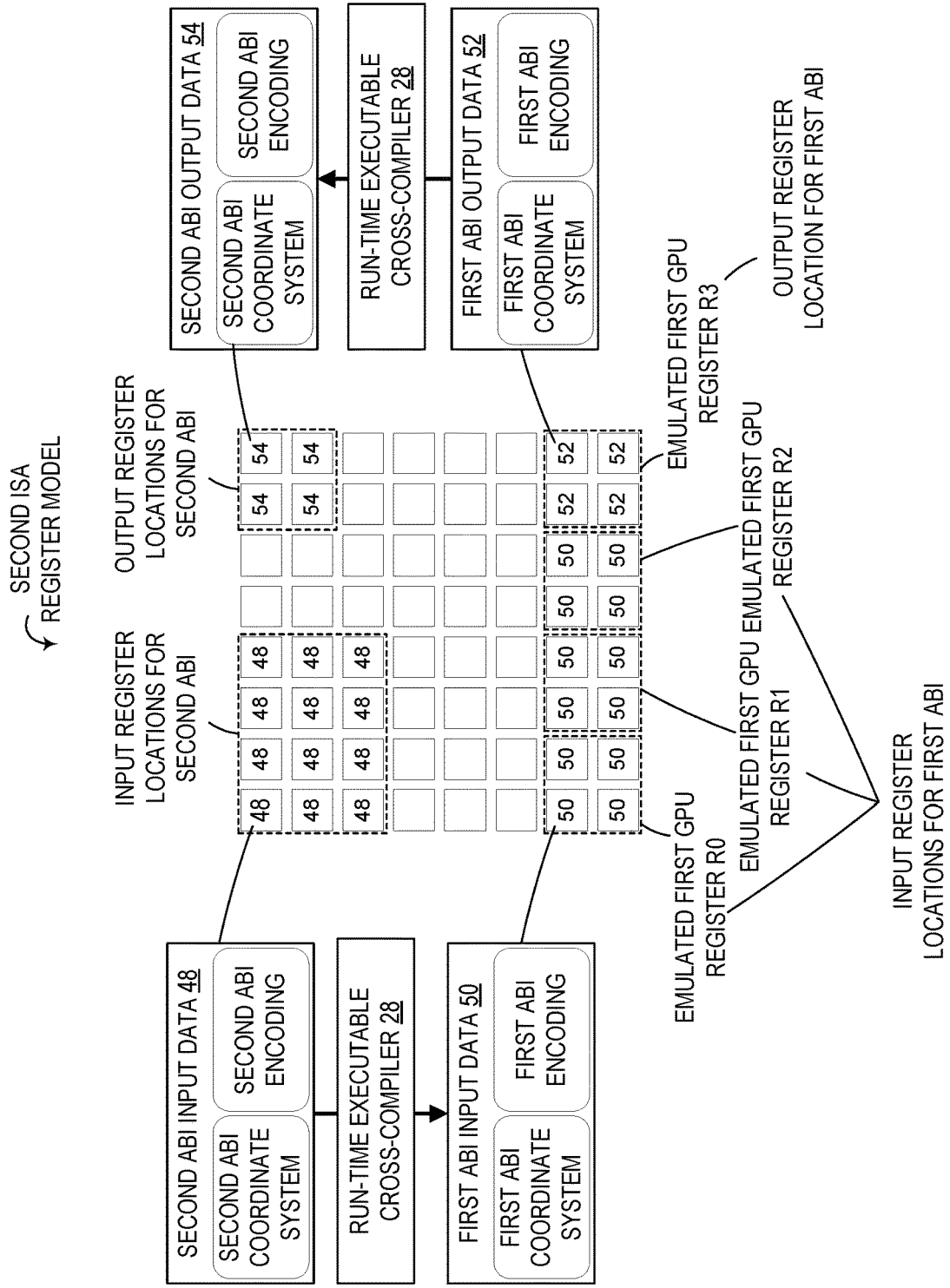
FIG. 6 shows an example application binary interface translation by the example run-time executable cross-compiler of FIG. 2.

FIG. 6 illustrates example ABI translations between example conventions of the first ABI 24A and example conventions of the second ABI 24B. In one example, when the second GPU 18B fetches input data from memory for one of the plurality of GPU-executed programs, the input data will conform to the conventions of the second ABI 24B of the second GPU 18B, as it is the second GPU 18B that is handing the fetch operation. As illustrated, the input data is fetched by the second GPU 18 as second ABI input data 48 that is formatted according to the conventions of the second ABI 24B, which may include a particular coordinate system format, a particular method of encoding, and other conventions of the second ABI 24B. Thus, the fetched second ABI input data 48 is formatted in the second ABI coordinate system and encoded according to the second ABI encoding method. However, the second ABI coordinate system and the second ABI encoding method may be different than the coordinate system and encoding method of the first ABI 24A.

Thus, in one example, to translate between the first ABI 24A and the second ABI 24B, the run-time executable cross-compiler is configured to translate between a first ABI coordinate system and a second ABI coordinate system. In the example illustrated in FIG. 6, to translate the second ABI input data 48 into suitable first ABI input data 50 that may be correctly consumed by the GPU-executed programs, the run-time executable cross-compiler 28 is configured to translate the second ABI input data 48 from the second ABI coordinate system to the first ABI coordinate system. In one specific example, the second ABI coordinate system may be [0, 1.0] in each axis, and the first ABI coordinate system may be [0, N] in each axis. Thus, in this example, conversion between the first and second ABI coordinate systems may include normalization. In another specific example, the second ABI coordinate system may be a half-open coordinate system, and the first ABI coordinate system may be an open coordinate system. As yet another specific example, the second ABI coordinate system may set the origin (0,0) in the center of a 2D region (e.g. screen) with x positive to the right and y positive down with each axis extents −1.0f to 1.0f, and the first ABI coordinate system may set a top-left corner as (0,0) and a bottom right corner as (width, height) of the 2D region. It will be appreciated that the above examples of first ABI and second ABI coordinate systems are merely exemplary, and that other types of coordinate systems not specifically mentioned above may also be translated between by the run-time executable cross-compiler 28.

In another example, to translate between the first ABI 24A and the second ABI 24B, the run-time executable cross-compiler 28 is configured to translate between a first ABI encoding and a second ABI encoding. In the example illustrated in FIG. 6, to translate the second ABI input data 48 into suitable first ABI input data 50 that may be correctly consumed by the GPU-executed programs, the run-time executable cross-compiler 28 is configured to translate second ABI input data 48 from the second ABI encoding to the first ABI encoding. In one specific example, the second ABI encoding may be IEEE 32 bit floating point and the first ABI encoding might be 10 bit fixed point. However, it will be appreciated that other encoding methods may also be translated between by the run-time executable cross-compiler 28.

As illustrated in FIG. 6, after being fetched by the second GPU 18B, the second ABI input data 48 will be temporarily stored at input register locations of the second ISA 22B register model of the second GPU 18B according to the conventions of the second ABI 24B. However, as the translated GPU-executed programs are still specified for the first ABI 24A after ISA translation, they expect the input data to be stored in input register locations defined by the first ABI 24A. Thus, without ABI translation, the second ABI input data 48 fetched by the second GPU 18B may not be placed into the register locations expected by the translated GPU-executed programs, and the translated GPU-executed programs may not correctly execute on the second GPU 18B.

In one example, the run-time executable cross-compiler 28 is configured to allocate registers of the second GPU 18B to emulate registers of the first GPU 18A including first ABI input register locations (R0, R1, and R2 in this specific example), and first ABI output register locations (R3 in this specific example), based on the summary data 40. As discussed previously, the summary data 40 gathered during the first iteration step may include register usage data, memory access pattern data, implicit control flow graph data, and other data. Based on the summary data 40, the run-time executable cross-compiler 28 may determine which registers the GPU-executed programs are accessing for input, and to which registers the GPU-executed programs are outputting according to the conventions of the first ABI 24A. After determining each GPU-executed program's expected input register locations and output register locations for the first ABI 24A, the run-time executable cross-compiler 28 may be configured to allocate a portion of the registers of the second GPU 18B to represent the expected input register locations and output register locations of the first ABI 24A.

In one specific example, the first ISA 22A of the first GPU 18A is the example VLIW ISA, which includes GPRs that are a group of four individually addressable elements. Further in this example, the second ISA 22B of the second GPU 18B is the example SIMD ISA, which includes GPRs that are singular addressable elements. Thus, in this example, to emulate a GPR of the first GPU 18A, the run-time executable cross-compiler may be configured to allocate four GPRs of the second GPU 18B to represent and emulate a single GPR of the first GPU 18A. It will be appreciated that the four-to-one emulation discussed above is merely exemplary, and other allocations of the registers of the second GPU 18B may be utilized to emulate registers of the first GPU 18A suitable for the architectural differences between the first and second GPUs, such as, for example, a one-to-one emulation, a one-to-four emulation, etc.

As illustrated in FIG. 6, the emulated registers of the first GPU 18A may be allocated to represent the expected input register locations and expected output register locations defined by the first ABI 24A that were identified in the summary data 40 during the first iteration step. In one example, to translate from the second ABI 24B to the first ABI 24A, the run-time executable cross-compiler 28 is configured to move input data from second ABI input register locations to emulated first ABI input register locations. For example, after translating the second ABI input data 48 into the first ABI input data 50 formatted for the first ABI 24A, the run-time executable cross-compiler 28 may be configured to move the first ABI input data 50 into the example emulated first ABI input register locations R0, R1, and R2, which are the expected input register locations for the GPU-executed programs conforming to the first ABI 24A.

Once the second ISA register model of the second GPU 18B has been appropriately initialized with data expected by the first ABI 24A via the method discussed above, the translated ISA instructions of a translated GPU-executed program may be executed. After execution of the translated ISA instructions, the translated GPU-executed program produces outputs in the example output register location R3 emulated by the allocated registers of the second GPU 18B. However, as the translated GPU-executed program is still specified for the first ABI 24A, the outputs of the that GPU-executed program will conform to the conventions of the first ABI 24A as first ABI output data 52. As illustrated, the first ABI output data 52 is formatted with the first ABI coordinate system, the first ABI encoding method, and other conventions of the first ABI 24A. Thus, in order for the second GPU 18B to appropriately handle the output, the run-time executable cross-compiler may be configured to translate the first ABI coordinate system, first ABI encoding method, and other first ABI conventions of the first ABI output data 52 to the corresponding format of the second ABI 24B of the second GPU 18B. After translating the first ABI output data 52 to second ABI output data 54 that conforms to the conventions of the second ABI 24B, the second ABI output data 54 may need to be moved to an output register location that is expected by the GPU 18B.

Thus, in one example, the run-time executable cross-compiler may be configured to move output data from emulated first ABI output register locations to second ABI output register locations defined by the second ABI 24A. After the output data has been translated from the first ABI 24A back to the second ABI 24B, including moved to output register locations expected by the second GPU 18B, then second GPU 18B may correctly handle the output data of the translated GPU-executed program.

Figure 7:
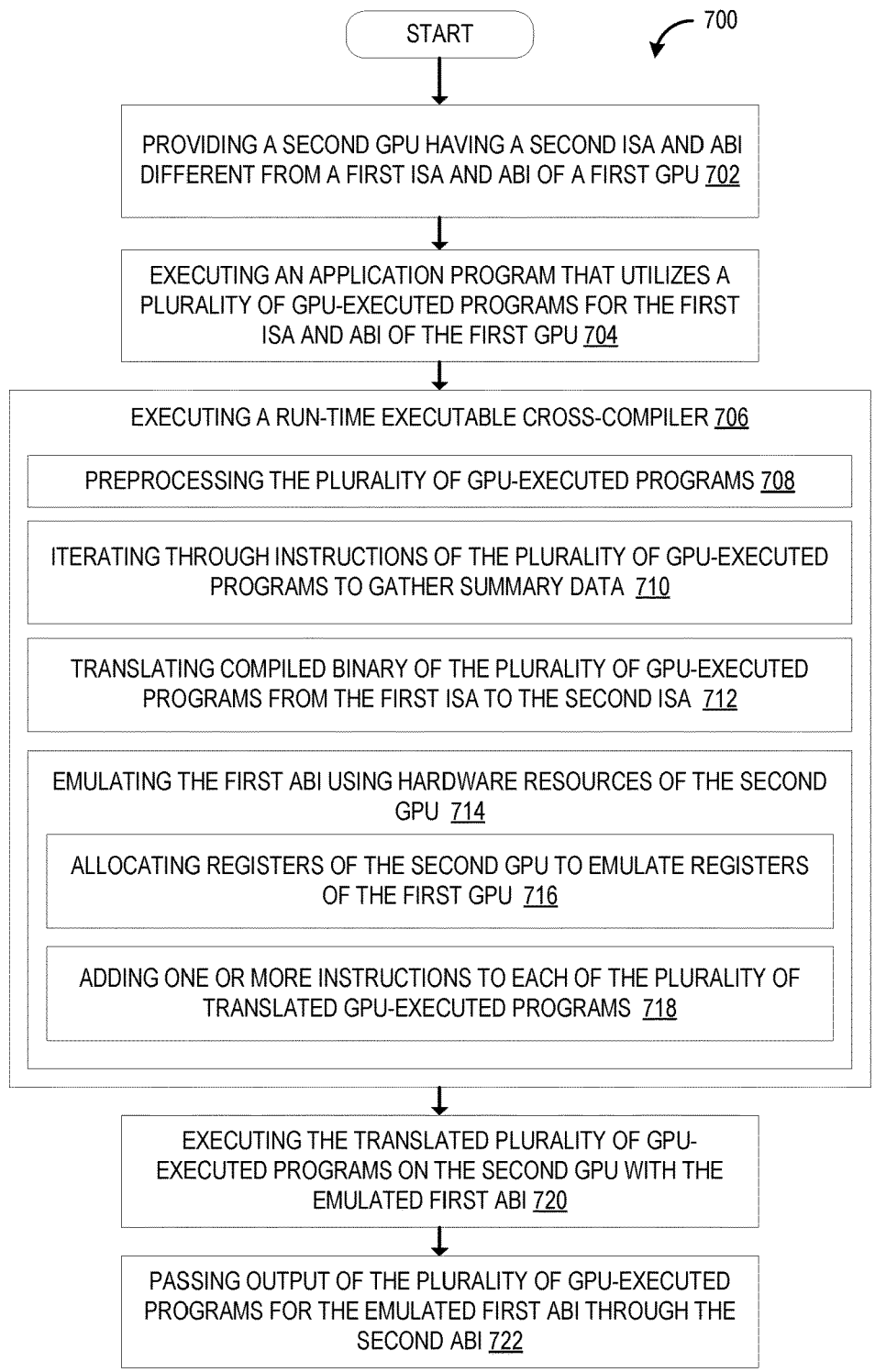
FIG. 7 shows an example method for the run-time executable cross-compiler of FIG. 2.

FIG. 7 shows an example computer-implemented method 700 for just-in-time cross-compiling compiled binaries of application programs that utilize graphics processing unit (GPU) executed programs configured to be executed on a first GPU having a first instruction set architecture (ISA) and a first application binary interface (ABI), according to an embodiment of the present disclosure. At step 702, the method 700 may include providing a second GPU having a second ISA and a second ABI different from the first ISA and the first ABI of the first GPU. Due to architectural differences between the first GPU 18A and the second GPU 18B, application programs configured to be executed using the first processor 16A and first GPU 18A may not be successfully executed using the second processor 16B and second GPU 18B, and vice versa. Due to the differences in architecture and design discussed above, application programs utilizing GPU-executed programs specified for the example VLIW ISA and a corresponding ABI are not binary compatible with the SIMD ISA and a corresponding ABI. However, by taking these known differences into account, instructions for the example VLIW ISA may be translated to instructions for the example SIMD ISA via rules mapping.

Proceeding to step 704, the method 700 may include executing an application program that utilizes a plurality of GPU-executed programs configured to be executed for the first ISA and first ABI of the first GPU. As the compiled binary of the application program 26 was configured for the specific architecture of the processor 16A and GPU 18A of the first computing device 12, the application program 26 may be run natively on the first computing device 12 without needing modifications. However, the same compiled binary of the application program 26 is not binary compatible with the second ISA 22B and second ABI 24B of the second GPU 18B of the second computing device 14.

Advancing to step 706, the method 700 may include executing a run-time executable cross-compiler while the application program is executing. In one example, the run-time executable cross-compiler 28 operates in a binary domain, and is configured to translate the plurality of GPU-executed programs 30, including ISA translations and ABI emulation and translation without inflation to an intermediate representation including a control flow graph. Thus, it will be appreciated that the run-time executable cross-compiler 28 is not recompiling source code or generating a higher level code representation and/or control flow graph of the already compiled binary of the GPU-executed programs before producing the translated GPU-executed programs.

Step 706 of method 700 may include steps 708-714. At step 708, the method 700 may include preprocessing the plurality of GPU-executed programs before performing translation. The run-time executable cross-compiler 28 preprocesses GPU-executed programs that are strictly legal for execution on the first GPU 18A of the first device 12, and relaxes constraints that are not required for the second GPU 18B of the second device 14. In one example, preprocessing the plurality of GPU-executed programs 30 includes removing instructions of the first ISA 22A that would translate to zero instructions in the second ISA 22B. In another example, preprocessing the plurality of GPU-executed programs 30 includes removing instructions which would be unreachable during execution. In yet another example, preprocessing the plurality of GPU-executed programs 30 includes removing flow control instructions which would always flow to themselves during execution.

At step 710, the method 700 may include, before translating each GPU-executed program of the plurality of GPU-executed programs, iterating through instructions of that GPU-executed program to gather summary data selected from the group consisting of register usage data, memory access pattern data, and implicit control flow graph data. In one example, the run-time executable cross-compiler may execute through a sequence of a plurality of GPU-executed programs, and gather summary data for the entire sequence. For example, the run-time executable cross-compiler may gather data about the inputs and outputs of each GPU-executed program in the sequence, and data regarding bindings between peers of GPU-executed programs in the sequence. Summary data for the entire sequence of GPU-executed programs may then be utilized when translating each of the GPU-executed programs by themselves.

At step 712, the method 700 may include translating compiled binary of the plurality of GPU-executed programs from the first ISA to the second ISA. In one example, the run-time executable cross-compiler 28 is configured to translate the plurality of GPU-executed programs based on rules mapping between instructions of the first ISA and the second ISA, and the summary data. Depending upon the specific GPU architectures, an instruction in the first ISA 22A does not always have an exact equivalent instruction in the second ISA 22B, such as in the example VLIW and SIMD architectural mismatch discussed previously. Thus, one instruction in the first ISA 22A may expand to zero instructions in the second ISA 22B when, for example, that instruction was peculiar to the hardware architecture of the first GPU 18A, or that instruction may be implicitly performed by the hardware of the second GPU 18B. In another example, one instruction in the first ISA 22A may expand to more than one instructions in the second ISA 22B, when, for example, multiple instructions from the second ISA 22B are required to be performed in sequence to perform a semantically equivalent function to that one instruction of the first ISA 22A.

At step 714, the method 600 may include emulating the first ABI using hardware resources of the second GPU by translating between the first ABI and the second ABI.

To accomplish this, in one example in which the run-time cross compiler 28 is configured to translate an instruction set of each of the plurality of GPU executed programs to produce a plurality of translated GPU executed programs, the emulation may be accomplished by the run-time executable cross-compiler translating from the second ABI 24B to the first ABI 24A for program inputs and translating from the first ABI to 24A the second ABI 24B for program outputs by insertion of corresponding ABI translation program instructions into the translated GPU executed programs. Executing the translated GPU executed programs includes executing those ABI translation program instructions during execution of each translated GPU-executed program 32 by the second GPU. In this manner, the rules of the first ABI 24A are nested inside the rules of the second ABI 24B.

Step 714 may include steps 716 and 718. At step 716, the method 700 may include allocating registers of the second GPU to emulate registers of the first GPU including first ABI input register locations and first ABI output register locations, based on the summary data. In one specific example, the ABI emulation tool 36 of the run-time executable cross-compiler may be configured to rearrange and reassign inputs and outputs to the GPRs of the second GPU 18B to emulate the GPR behavior of the first ABI 24A for the first GPU 18A. In the VLIW vs SIMD ISA example, GPRs in the VLIW ISA and associated ABI is a group of four individually addressable elements, while GPRs in the SIMD ISA and associated ABI is a singular. Thus, to emulate the VLIW and associated ABI GPRs using the SIMD ISA and associated ABI GPRs, the ABI emulation tool 36 may be configured to assign four GPRs of the SIMD ISA together to emulate one GPR of the VLIW ISA. By associating GPRs together in this manner, the ABI emulation tool 36 may emulate the GPR environment and rules of the first GPU 18A using the hardware resources of the second GPU 18B.

Additionally, based on the summary data gathered during the first iteration step, the run-time executable cross-compiler may be configured to determine which first ABI input register locations for the first GPU 18A each GPU-executed program consumes data from, and which first ABI output register locations for the first GPU 18B each GPU-executed program outputs data to. Based on these determinations, the run-time executable cross-compiler may be configured to allocate registers of the second GPU 18B to represent the first ABI input and output register locations, such that the translated GPU-executed program may execute correctly on the second GPU 18B.

At step 716, the method 700 may include adding one or more instructions to each of the plurality of GPU-executed programs. These instructions are added during the translation/emulation steps prior to execution of the plurality of GPU executed programs by the second GPU. One or more instructions may be added to each GPU-executed program before its translated ISA instructions, and one or more instructions may be added to each GPU-executed program after its translated ISA instructions. In one example, the instructions include modifying input formatted for the second ABI and converting it to input formatted for the first ABI, and modifying output formatted for the first ABI and converting it to output formatted for the second ABI. In one example, the modifications include translating between a first ABI coordinate system and a second ABI coordinate system. In another example, the modifications include translating between a first ABI encoding and a second ABI encoding. In another example, the instructions include moving input data from second ABI input register locations to emulated first ABI input register locations, and moving output data from emulated first ABI output register locations to second ABI output register locations. These one or more instructions added to each translated GPU-executed program perform the ABI translations before and after execution of the translated ISA instructions, such that they may be correctly executed on the second GPU 18B.

Advancing to step 720, the method 700 may include executing the plurality of GPU-executed programs on the second GPU with the emulated first ABI. Proceeding to step 722, the method 700 may include passing output of the plurality of GPU-executed programs for the emulated first ABI through the second ABI. For example, the results of execution of the translated plurality of GPU-executed programs 32 may be returned to the application program 26 currently being executed through the second GPU 18B communicating according to the conventions of the second ABI 24B.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
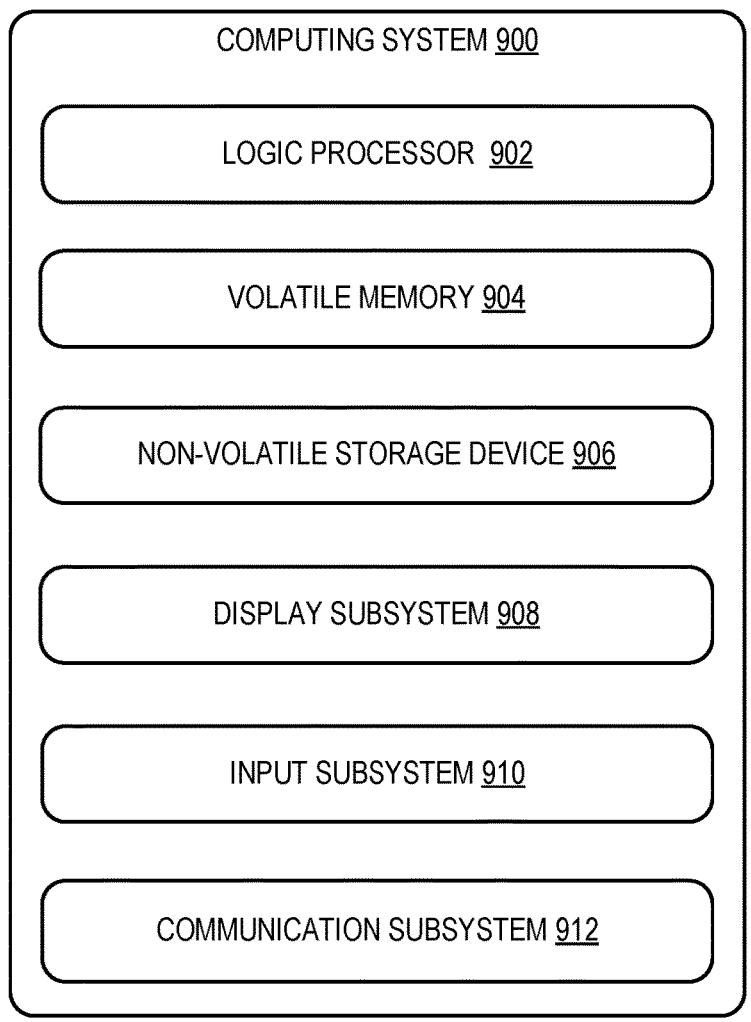
FIG. 8 shows an example computing system according to an embodiment of the present description.

FIG. 8 schematically shows a non-limiting embodiment of a computing system 900 that can enact one or more of the methods and processes described above. Computing system 900 is shown in simplified form. Computing system 900 may embody the first computing device 12 and the second computing device 14 described above. Computing system 900 may take the form of one or more gaming consoles, personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902, volatile memory 904, and a non-volatile storage device 906. Computing system 900 may optionally include a display subsystem 908, input subsystem 910, communication subsystem 912, and/or other components not shown in FIG. 8.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 900 to send and/or receive messages to and/or from other devices via a network such as the Internet.

The following paragraphs provide additional support for the claims of the subject application. One aspect provides a computing device for just-in-time cross-compiling compiled binaries of application programs that utilize graphics processing unit (GPU) executed programs configured to be executed on a first GPU having a first application binary interface (ABI), the computing device comprising a second GPU having a second ABI different from the first ABI of the first GPU, and a processor configured to execute an application program that utilizes a plurality of GPU-executed programs configured to be executed for the first ABI of the first GPU, and execute a run-time executable cross-compiler configured to, while the application program is being executed, emulate the first ABI using hardware resources of the second GPU by translating between the first ABI and the second ABI, wherein the second GPU is configured to execute the plurality of GPU-executed programs on the second GPU with the emulated first ABI, and pass output of the plurality of GPU-executed programs for the emulated first ABI through the second ABI. In this aspect, additionally or alternatively, translating between the first ABI and second ABI may be accomplished by adding one or more instructions to each of the plurality of GPU-executed programs prior to execution of the plurality of GPU executed programs by the second GPU, the instructions being configured to modify input formatted for the second ABI and convert it to input formatted for the first ABI, and modify output formatted for the first ABI and convert it to output formatted for the second ABI. In this aspect, additionally or alternatively, the run-time executable cross-compiler may be configured to emulate the first ABI without inflation to an intermediate representation including a control flow graph. In this aspect, additionally or alternatively, the run-time cross compiler may be configured to translate an instruction set of each of the plurality of GPU executed programs to produce a plurality of translated GPU executed programs, and wherein to emulate the first ABI, the run-time executable cross-compiler may be configured to translate from the second ABI to the first ABI and translate from the first ABI to the second ABI by insertion of corresponding ABI translation program instructions into the translated GPU executed programs, and wherein the second GPU may be configured to execute those translation instructions during execution of each translated GPU-executed program. In this aspect, additionally or alternatively, to translate between the first ABI and the second ABI, the run-time executable cross-compiler may be configured to translate between a first ABI coordinate system and a second ABI coordinate system. In this aspect, additionally or alternatively, to translate between the first ABI and the second ABI, the run-time executable cross-compiler may be configured to translate between a first ABI encoding and a second ABI encoding. In this aspect, additionally or alternatively, the run-time executable cross-compiler may be configured to iterate through instructions of each of the plurality of GPU-executed programs to gather summary data selected from the group consisting of register usage data, memory access pattern data, and implicit control flow graph data. In this aspect, additionally or alternatively, the run-time executable cross-compiler may be configured to allocate registers of the second GPU to emulate registers of the first GPU including first ABI input register locations and first ABI output register locations, based on the summary data. In this aspect, additionally or alternatively, to translate from the second ABI to the first ABI, the run-time executable cross-compiler may be configured to move input data from second ABI input register locations to emulated first ABI input register locations. In this aspect, additionally or alternatively, to translate from the first ABI to the second ABI, the run-time executable cross-compiler may be configured to move output data from emulated first ABI output register locations to second ABI output register locations. In this aspect, additionally or alternatively, the plurality of GPU-executed programs may be configured to be executed for a first instruction set architecture (ISA) of the first GPU, the second GPU may have second ISA different from the first ISA of the first GPU, and the run-time executable cross-compiler may be configured to, while the application program is being executed, translate compiled binary of the plurality of GPU-executed programs from the first ISA to the second ISA.

Another aspect provides a method for just-in-time cross-compiling compiled binaries of application programs that utilize graphics processing unit (GPU) executed programs configured to be executed on a first GPU having a first application binary interface (ABI), the method comprising providing a second GPU having a second ABI different from the first ABI of the first GPU, executing an application program that utilizes a plurality of GPU-executed programs configured to be executed for the first ABI of the first GPU, executing a run-time executable cross-compiler including, while the application program is executing, emulating the first ABI using hardware resources of the second GPU by translating between the first ABI and the second ABI, and executing the plurality of GPU-executed programs on the second GPU with the emulated first ABI, and passing output of the plurality of GPU-executed programs for the emulated first ABI through the second ABI. In this aspect, additionally or alternatively, translating between the first ABI and second ABI may be accomplished by adding one or more instructions to each of the plurality of GPU-executed programs prior to execution of the plurality of GPU executed programs by the second GPU, the instructions including modifying input formatted for the second ABI and converting it to input formatted for the first ABI, and modifying output formatted for the first ABI and converting it to output formatted for the second ABI. In this aspect, additionally or alternatively, the run-time cross compiler may be configured to translate an instruction set of each of the plurality of GPU executed programs to produce a plurality of translated GPU executed programs, and wherein emulating the first ABI may include the run-time executable cross-compiler translating from the second ABI to the first ABI for program inputs and translating from the first ABI to the second ABI for program outputs by insertion of corresponding ABI translation program instructions into the translated GPU executed programs, and wherein executing may include executing those ABI translation program instructions during execution of each translated GPU-executed program by the second GPU. In this aspect, additionally or alternatively, translating between the first ABI and the second ABI may include translating between a first ABI coordinate system and a second ABI coordinate system. In this aspect, additionally or alternatively, translating between the first ABI and the second ABI may include translating between a first ABI encoding and a second ABI encoding. In this aspect, additionally or alternatively, iterating through instructions of each of the plurality of GPU-executed programs to gather summary data selected from the group consisting of register usage data, memory access pattern data, and implicit control flow graph data. In this aspect, additionally or alternatively, allocating registers of the second GPU to emulate registers of the first GPU including first ABI input register locations and first ABI output register locations, based on the summary data. In this aspect, additionally or alternatively, translating from the second ABI to the first ABI may include moving input data from second ABI input register locations to emulated first ABI input register locations, and translating from the first ABI to the second ABI may include moving output data from emulated first ABI output register locations to second ABI output register locations.

Another aspect provides a computing device for just-in-time cross-compiling compiled binaries of application programs that utilize graphics processing unit (GPU) executed programs configured to be executed on a first GPU having a first application binary interface (ABI), the computing device comprising a second GPU having a second ABI different from the first ABI of the first GPU, and a processor configured to execute an application program that utilizes a plurality of GPU-executed programs configured to be executed for the first ABI of the first GPU, and execute a run-time executable cross-compiler configured to, while the application program is being executed iterate through instructions of each of the plurality of GPU-executed programs to gather summary data selected from the group consisting of register usage data, memory access pattern data, and implicit control flow graph data, allocate registers of the second GPU to emulate registers of the first GPU including first ABI input register locations and first ABI output register locations, based on the summary data, and emulate the first ABI using the emulated registers and translating between the first ABI and the second ABI, wherein the second GPU is configured to execute the plurality of GPU-executed programs on the second GPU with the emulated first ABI, and pass output of the plurality of GPU-executed programs for the emulated first ABI through the second ABI.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device for just-in-time cross-compiling compiled binaries of application programs that utilize graphics processing unit (GPU) executed programs configured to be executed on a first GPU having a first application binary interface (ABI), the computing device comprising:
a second GPU having a second ABI different from the first ABI of the first GPU; and
a processor configured to:
execute an application program that utilizes a plurality of GPU-executed programs configured to be executed for the first ABI of the first GPU; and
execute a run-time executable cross-compiler configured to, while the application program is being executed, emulate the first ABI using hardware resources of the second GPU by translating between the first ABI and the second ABI;
wherein the second GPU is configured to:
execute the plurality of GPU-executed programs on the second GPU with the emulated first ABI, and pass output of the plurality of GPU-executed programs for the emulated first ABI through the second ABI.

2. The computing device of claim 1, wherein translating between the first ABI and second ABI is accomplished by adding one or more instructions to each of the plurality of GPU-executed programs prior to execution of the plurality of GPU executed programs by the second GPU, the instructions being configured to modify input formatted for the second ABI and convert it to input formatted for the first ABI, and modify output formatted for the first ABI and convert it to output formatted for the second ABI.

3. The computing device of claim 1, wherein the run-time executable cross-compiler is configured to emulate the first ABI without inflation to an intermediate representation including a control flow graph.

4. The computing device of claim 1, wherein the run-time cross compiler is configured to translate an instruction set of each of the plurality of GPU executed programs to produce a plurality of translated GPU executed programs, and wherein to emulate the first ABI, the run-time executable cross-compiler is configured to translate from the second ABI to the first ABI and translate from the first ABI to the second ABI by insertion of corresponding ABI translation program instructions into the translated GPU executed programs, and wherein the second GPU is configured to execute those translation instructions during execution of each translated GPU-executed program.

5. The computing device of claim 4, wherein to translate between the first ABI and the second ABI, the run-time executable cross-compiler is configured to translate between a first ABI coordinate system and a second ABI coordinate system.

6. The computing device of claim 4, wherein to translate between the first ABI and the second ABI, the run-time executable cross-compiler is configured to translate between a first ABI encoding and a second ABI encoding.

7. The computing device of claim 4, wherein the run-time executable cross-compiler is configured to iterate through instructions of each of the plurality of GPU-executed programs to gather summary data selected from the group consisting of register usage data, memory access pattern data, and implicit control flow graph data.

8. The computing device of claim 7, wherein the run-time executable cross-compiler is configured to allocate registers of the second GPU to emulate registers of the first GPU including first ABI input register locations and first ABI output register locations, based on the summary data.

9. The computing device of claim 8, wherein to translate from the second ABI to the first ABI, the run-time executable cross-compiler is configured to move input data from second ABI input register locations to emulated first ABI input register locations.

10. The computing device of claim 8, wherein to translate from the first ABI to the second ABI, the run-time executable cross-compiler is configured to move output data from emulated first ABI output register locations to second ABI output register locations.

11. The computing device of claim 1, wherein the plurality of GPU-executed programs are configured to be executed for a first instruction set architecture (ISA) of the first GPU;
the second GPU having a second ISA different from the first ISA of the first GPU; and
the run-time executable cross-compiler is configured to, while the application program is being executed, translate compiled binary of the plurality of GPU-executed programs from the first ISA to the second ISA.

12. A method for just-in-time cross-compiling compiled binaries of application programs that utilize graphics processing unit (GPU) executed programs configured to be executed on a first GPU having a first application binary interface (ABI), the method comprising:
providing a second GPU having a second ABI different from the first ABI of the first GPU;
executing an application program that utilizes a plurality of GPU-executed programs configured to be executed for the first ABI of the first GPU;
executing a run-time executable cross-compiler including, while the application program is executing, emulating the first ABI using hardware resources of the second GPU by translating between the first ABI and the second ABI; and
executing the plurality of GPU-executed programs on the second GPU with the emulated first ABI, and passing output of the plurality of GPU-executed programs for the emulated first ABI through the second ABI.

13. The method of claim 12, wherein translating between the first ABI and second ABI is accomplished by adding one or more instructions to each of the plurality of GPU-executed programs prior to execution of the plurality of GPU executed programs by the second GPU, the instructions including modifying input formatted for the second ABI and converting it to input formatted for the first ABI, and modifying output formatted for the first ABI and converting it to output formatted for the second ABI.

14. The method of claim 12, wherein the run-time cross compiler is configured to translate an instruction set of each of the plurality of GPU executed programs to produce a plurality of translated GPU executed programs, and wherein emulating the first ABI includes the run-time executable cross-compiler translating from the second ABI to the first ABI for program inputs and translating from the first ABI to the second ABI for program outputs by insertion of corresponding ABI translation program instructions into the translated GPU executed programs, and wherein executing includes executing those ABI translation program instructions during execution of each translated GPU-executed program by the second GPU.

15. The method of claim 14, wherein translating between the first ABI and the second ABI includes translating between a first ABI coordinate system and a second ABI coordinate system.

16. The method of claim 14, wherein translating between the first ABI and the second ABI includes translating between a first ABI encoding and a second ABI encoding.

17. The method of claim 14, further comprising iterating through instructions of each of the plurality of GPU-executed programs to gather summary data selected from the group consisting of register usage data, memory access pattern data, and implicit control flow graph data.

18. The method of claim 17, further comprising allocating registers of the second GPU to emulate registers of the first GPU including first ABI input register locations and first ABI output register locations, based on the summary data.

19. The method of claim 18, wherein translating from the second ABI to the first ABI includes moving input data from second ABI input register locations to emulated first ABI input register locations, and translating from the first ABI to the second ABI includes moving output data from emulated first ABI output register locations to second ABI output register locations.

20. A computing device for just-in-time cross-compiling compiled binaries of application programs that utilize graphics processing unit (GPU) executed programs configured to be executed on a first GPU having a first application binary interface (ABI), the computing device comprising:

a second GPU having a second ABI different from the first ABI of the first GPU; and
a processor configured to:
  execute an application program that utilizes a plurality of GPU-executed programs configured to be executed for the first ABI of the first GPU; and
  execute a run-time executable cross-compiler configured to, while the application program is being executed:
    iterate through instructions of each of the plurality of GPU-executed programs to gather summary data selected from the group consisting of register usage data, memory access pattern data, and implicit control flow graph data;
    allocate registers of the second GPU to emulate registers of the first GPU including first ABI input register locations and first ABI output register locations, based on the summary data; and
    emulate the first ABI using the emulated registers and translating between the first ABI and the second ABI;
wherein the second GPU is configured to;
  execute the plurality of GPU-executed programs on the second GPU with the emulated first ABI, and pass output of the plurality of GPU-executed programs for the emulated first ABI through the second ABI.

* * * * *